(12) United States Patent
Fischbein

(10) Patent No.: US 8,453,535 B2
(45) Date of Patent: Jun. 4, 2013

(54) SELECTOR LEVER ARRANGEMENT FOR AUTOMATIC TRANSMISSIONS OF MOTOR VEHICLES

(75) Inventor: Igor Fischbein, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 557 days.

(21) Appl. No.: 12/820,225

(22) Filed: Jun. 22, 2010

(65) Prior Publication Data

US 2010/0326225 A1      Dec. 30, 2010

(30) Foreign Application Priority Data

Jun. 25, 2009   (DE) .......................... 10 2009 027 193

(51) Int. Cl.
*B60K 20/02* (2006.01)
(52) U.S. Cl.
USPC ........................ 74/524; 74/473.18; 74/473.3
(58) Field of Classification Search
USPC .................... 74/473.1, 473.18, 473.3, 524
See application file for complete search history.

(56) References Cited

U.S. PATENT DOCUMENTS

| | | | | |
|---|---|---|---|---|
| 2,172,663 | A | * | 9/1939 | Manning .................... 74/473.29 |
| 5,142,928 | A | * | 9/1992 | Buti et al. ....................... 74/335 |
| 5,845,534 | A | * | 12/1998 | Kim ............................ 74/473.12 |
| 6,513,406 | B1 | * | 2/2003 | Murray et al. .................. 74/523 |

FOREIGN PATENT DOCUMENTS

EP        736408 A2 * 10/1996

* cited by examiner

*Primary Examiner* — William C Joyce
*Assistant Examiner* — Terence Boes
(74) *Attorney, Agent, or Firm* — James Dottavio; MacMillian, Sobanski & Todd, LLC

(57) ABSTRACT

Selector lever arrangement for automatic transmissions of motor vehicles, having a manual shift facility and a selector lever, which in a shifting gate can be moved forwards or backwards in only one plane into the positions P, R, N and D, all positions being situated in series in one plane and the selector lever having a hand rest together with a release mechanism, the hand rest being pivotally guided relative to the selector lever by way of a four-bar linkage, in such a way that its angle in relation to the selector lever varies according to the position of the selector lever.

10 Claims, 4 Drawing Sheets

SELECTOR LEVER ARRANGEMENT FOR AUTOMATIC TRANSMISSIONS OF MOTOR VEHICLES

CROSS REFERENCE TO RELATED APPLICATIONS

This application claims priority to and the benefit of German Application Number DE 102009027193.7, Filed Jun. 25, 2009, the full disclosure of which is incorporated herein by reference.

BACKGROUND OF THE INVENTION

The invention relates to a selector lever arrangement for automatic transmissions of motor vehicles, having a manual shift facility and a selector lever, which in a shifting gate can be moved forwards or backwards in only one plane into the positions park, reverse, neutral, and drive (P, R, N and D).

EP 0 736 408 B1, for example, discloses such a selector lever arrangement for automatic transmissions of motor vehicles, having a manual shift facility and a selector lever, which in a shifting gate can be moved forwards or backwards in only one plane into the positions P, R, N and D.

For manual shifting, the selector lever in EP 0 736 408 B1 following the position D, is brought into a further neutral position M, from which it can be moved in a spring-loaded return movement into a forward position "+" actuating a switch to produce an upward shift, and into a rear position "−" actuating a switch to produce a downward shift. In this case all positions are situated in one plane. The selector lever in a detent gate can furthermore be brought out of the position D into the area of the further neutral position M only by operating a locking button on the handle for the actuation of a spring-loaded locking pin, which interacts with the detent gate, after overcoming a locking cam, the further neutral position M on the detent gate being formed by a roof-shaped angle section and the spring-loaded locking pin interacting with the detent gate standing at the apex of the angle section when in the neutral position M and after shifting forward "+" or backward "−" being returned, spring-loaded, to the neutral position M by the slanting of the angle section.

As can be seen, the locking button is fitted on the side or the front of the handle of the selector lever. The locking button usually also serves to allow exit from the park position or also changing of the gear position.

For ergonomic reasons the hand rest is here designed thicker in the upper area. Such selector lever arrangements are usually located in the area of the center console between the seats next to the driver, so that the hand rest is well within the reach of the driver and the park position P ends just before the transition to the dashboard. This presents the problem that the driver is virtually touching the console with his hand or there is only very little space available, which is perceived as uncomfortable. It would certainly be desirable to design the hand rest larger, so as to afford the driver a comfortable support for the hand.

The selector lever arrangements, however, reach a compromise between driver ergonomics and the necessary mechanical function, this compromise being at the expense of the ergonomics.

SUMMARY OF THE INVENTION

Accordingly, an object of an embodiment of the present invention is to provide a selector lever arrangement in which the ergonomics do not suffer and are optimized. In addition, the selector lever arrangement allows for easier operation and a manual shift or a gear change.

Pivotally guiding the hand rest relative to the selector lever, by way of a four-bar linkage, in such a way that its angle in relation to the selector lever varies according to the position of the selector lever affords the driver an ergonomically optimum arrangement of the hand rest according to the position of the selector lever. That is to say, the disposition of the driver's hand on the hand rest is comfortable in all positions of the selector lever or optimized in respect of the hand position. This likewise makes it possible to arrange manual shift devices, locking buttons etc. so that they are optimally accessible to the fingers of the vehicle operator.

In addition, this development allows the hand rest in the forward position to be swiveled upward in the direction of the dashboard. This increases the distance from the dashboard or its transition to the center console, which is likewise generally perceived as comfortable by a vehicle operator.

For this purpose, the hand rest may be pivotally articulated on the selector lever about a first axis arranged transversely to the shift direction of the selector lever. The hand rest may also be pivotally articulated on a guide about a second axis arranged transversely to the shift direction of the selector lever.

The guide at one end may be pivotally articulated on the hand rest and at the other end fastened so that it can pivot in the plane.

The four-bar linkage is formed by two pivot axes, the selector lever and the hand rest itself, together with the guide. This allows the hand rest to be automatically pivoted upwards during the movement forwards.

A simple assembly may be obtained if the guide is affixed in the plane extending in the shift direction of the selector lever and offset in relation to the lever.

The first axis and the second axis may be arranged offset in relation to one another in the shift direction of the selector lever. In this case the first axis—viewed in the direction of the vehicle—may be arranged in front of the second axis or behind the second axis. This means that the guide—viewed in the direction of travel—is located in front of or behind the selector lever. The movement sequence of the hand rest can thereby be better adapted to the overall space available.

An ergonomic hand rest may be of elongated design in the shift direction of the selector lever. This allows the second axis to be located on the rear area of the hand rest, viewed in the shift direction of the selector lever, that is to say the hand rest projects rearward beyond the first axis.

The existing selector lever arrangements usually have a locking button to enable the movement of the selector lever. Such a release mechanism may here also be provided in the form of a button, switch, etc. The invention may provide a more ergonomic facility, however, in allowing actuation of the release mechanism by the hand rest itself. A movement of the hand rest while the selector lever is stationary can therefore be used for release purposes. One possibility is for the guide to be operatively connected to the release mechanism in such a way that the latter is actuated by the guide on pivoting of the hand rest. For this purpose, for example, the guide may be articulated on a switch located at is fixing point. Alternatively a "mechanism" or the like could be arranged in the hand rest itself and/or the selector lever.

The selector lever arrangement may also allow manual shifting. For this purpose the hand rest may comprise an actuating device, such as a rocker switch etc.

Alternatively, the new type of hand rest may have an actuating device for the manual shift that is actuated by the guide when the selector lever is situated in the position D, the latter for this purpose being articulated on a switch located at its fixing point.

The pivoting movement of the hand rest can therefore be used for the actuation of a correspondingly designed switch, which is actuated by the guide.

BRIEF DESCRIPTION OF THE DRAWINGS

Further details, features and advantages of the invention are set forth in the following description of two exemplary embodiments, with reference to the drawings, in which.

DETAILED DESCRIPTION

Figure 1:
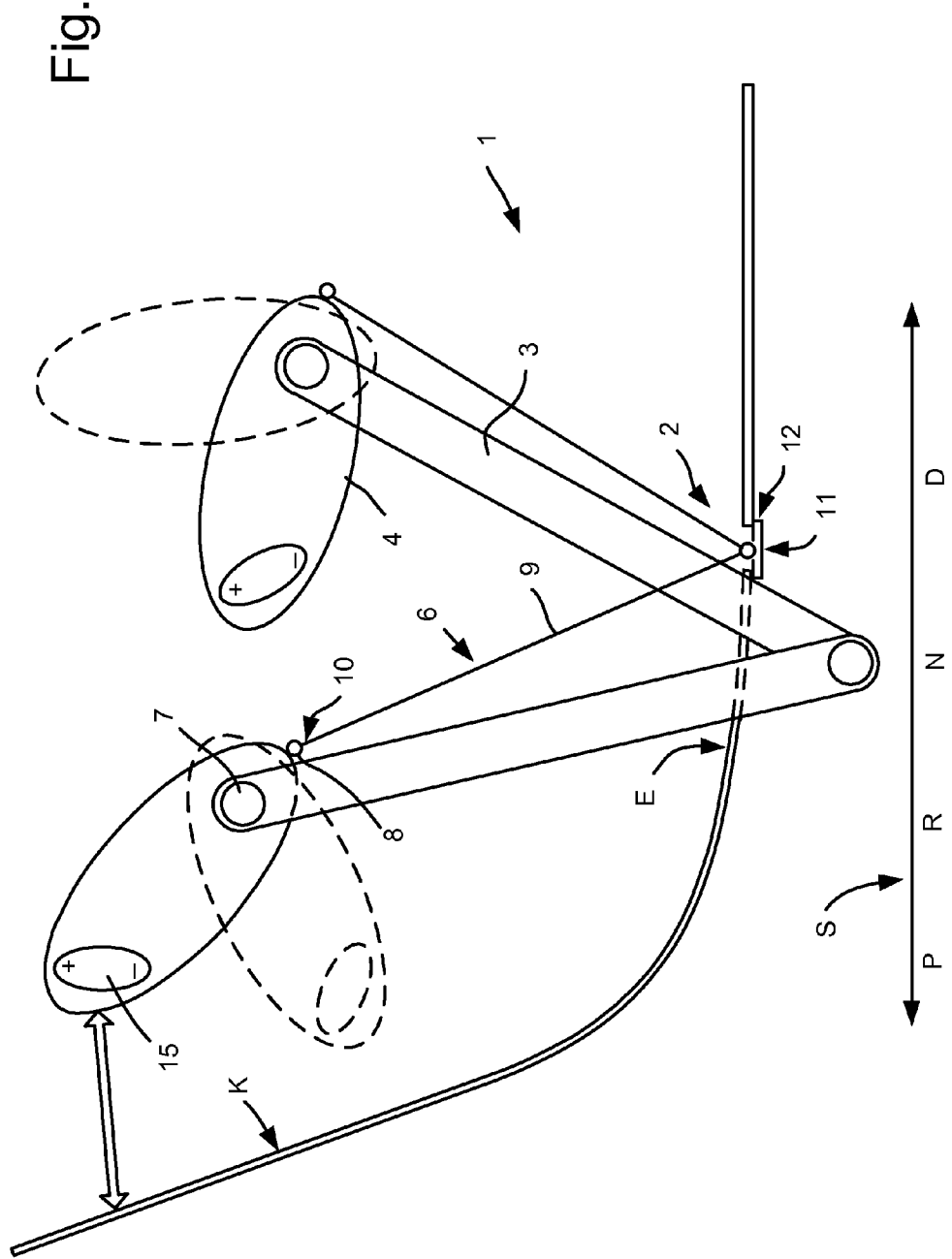
FIG. 1 shows a schematic sketch of the operating principle of the selector lever arrangement.

FIG. 1 shows a selector lever arrangement 1 for automatic transmissions of motor vehicles having a manual shift facility and a selector lever 3, which in a shifting gate 2 can be moved forwards or backwards in only one plane E into the positions P, R, N and D, all positions being situated in series in the plane E and the selector lever 3 having a hand rest 4 together with a release mechanism. One form the release mechanism may take is the release mechanism 5 shown in FIG. 3, discussed below. Other types of release mechanisms (not shown) may be employed instead, if so desired. The selector lever arrangement 1 is shown in two different positions in FIG. 1, the park position (P) (shown as the leftmost position of the hand rest in FIG. 1) and the drive position (D) (shown as the rightmost position of the hand rest in FIG. 1).

It will be seen that in the prior art versions of the unadjusted hand rest represented by dashed lines in FIG. 1, the hand rest either leaves little clearance between it and the console K (left-hand position P) or is not ergonomically oriented (right-hand position D).

Figure 2:
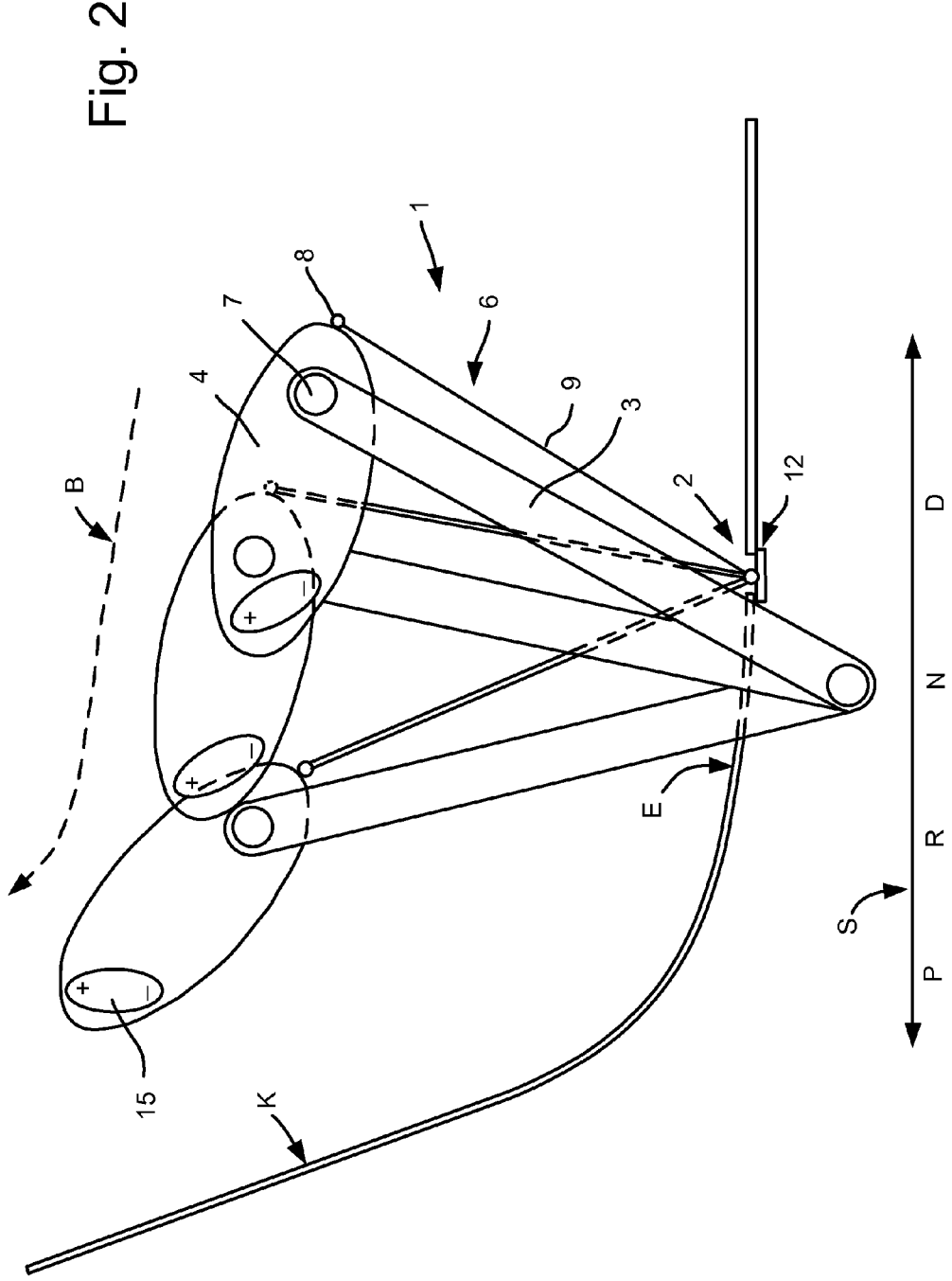
FIG. 2 shows a schematic sketch of the movement sequence of the hand rest of the selector lever arrangement in FIG. 1.

The pivotal configuration of the hand rest 4 of the present invention makes it possible to assume both advantageous positions (solid lines in FIG. 1), that is to say the hand rest 4 assumes the space-saving, ergonomically upturned attitude in the position P (on the left side of FIG. 1) and in the position D assumes a down-turned or approximately horizontal orientation relative to this (on the right side of FIG. 2). This is achieved since the hand rest 4 is pivotally articulated relative to the selector lever 3 via a four-bar linkage 6 in such a way that the hand rest angle relative to the selector lever 3 varies according to the position of the selector lever 3.

The hand rest 4 is pivotally articulated on the selector lever 3 about a first axis 7 arranged transversely to the shift direction S of the selector lever. The first axis 7, thus, moves with the selector lever 3 and is centered on the axis about which the hand rest 4 pivots relative to the selector lever 3.

The hand rest 4 is furthermore pivotally articulated on a guide 9 about a second axis 8, likewise arranged transversely to the shift direction S of the selector lever 3. The second axis 8 is centered on the connection point between the guide 9 and the hand rest 4 and moves with the guide 9. The guide 9 at one end 10 is pivotally articulated on the hand rest 4 and at the other end 11 is fastened at a fixing point 12 so that it can pivot in the plane E.

Not only is the guide 9 arranged offset in relation to the selector lever 3 in the plane E in the shift direction S of the selector lever, but the first axis 7 and the second axis 8 are arranged offset in relation to one another in the shift direction S of the selector lever 3, in the hand rest 4, which is elongated in this direction. The second axis 8 is therefore located on the rear area of the selector lever 3, viewed in its shift direction S, on the projecting length of the hand rest 4.

FIG. 2 shows the movement of the hand rest 4 achievable with this configuration as the selector lever 3 is moved from the rear position D (the rightmost hand rest shown in FIG. 2) into the forward position P (the leftmost hand rest shown in FIG. 2). It will be seen that the pivoting movement B occurs substantially in the final movement phase from the position R to the position P. On the other hand, in the movement from the position D to N (the middle position of the hand rest shown in FIG. 2 is in about the N position), virtually no change in the angle occurs.

Figure 3:
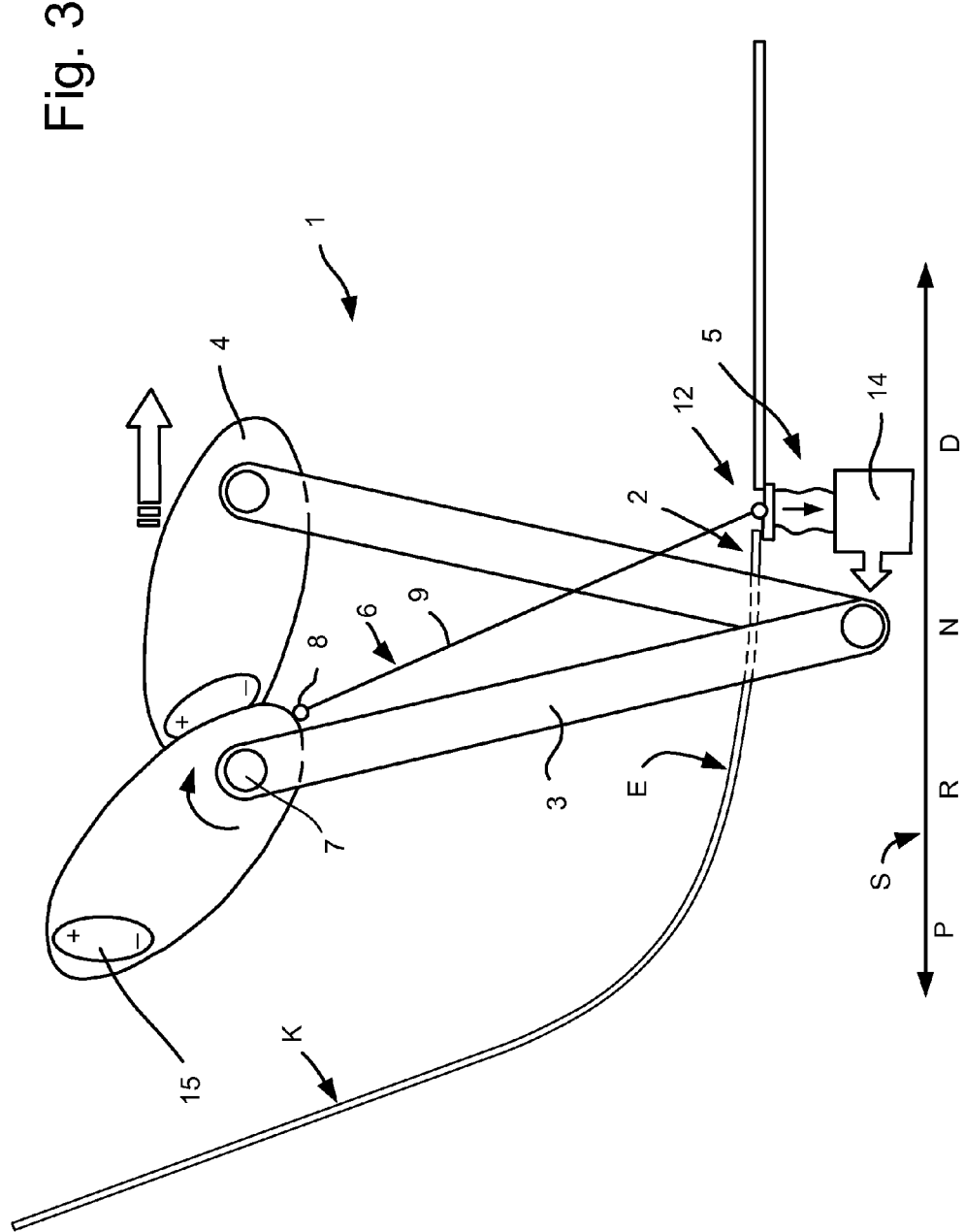
FIG. 3 shows a schematic sketch of the use of the hand rest for releasing the selector lever, adding a switch to the embodiments of FIGS. 1 and 2.

FIG. 3 shows a variation of the embodiment of FIGS. 1 and 2 where the selector lever arrangement 1 furthermore has the release mechanism 5, designed to be actuated by the hand rest 4 via the guide 9. The release mechanism 5 serves to unlock or release the selector lever 3 and to allow it to move in the shifting gate 2.

For this purpose the guide 9 is operatively connected to the release mechanism 5 in such a way that the latter is actuated by the guide 9 under a manual rotation of the hand rest 4. In other words, with the selector lever 3 stationary, the hand rest 4 is manually pivoted upwards by the driver so that the guide 9 pushes on the release mechanism 5 to perform the release of the selector lever 3. When the guide 9 pushes on the release mechanism 5, the release mechanism 5 actuates a switch 14, located below the fixing point 12, which causes the release of the selector lever 3.

In addition, for manual shifting, the hand rest 4 may have a rocker switch 15 (shown in FIGS. 1-3), which allows manually controlled upward and downward shifting of the transmission, indicated by the plus and minus symbols, through its actuation at opposite ends.

Figure 4:
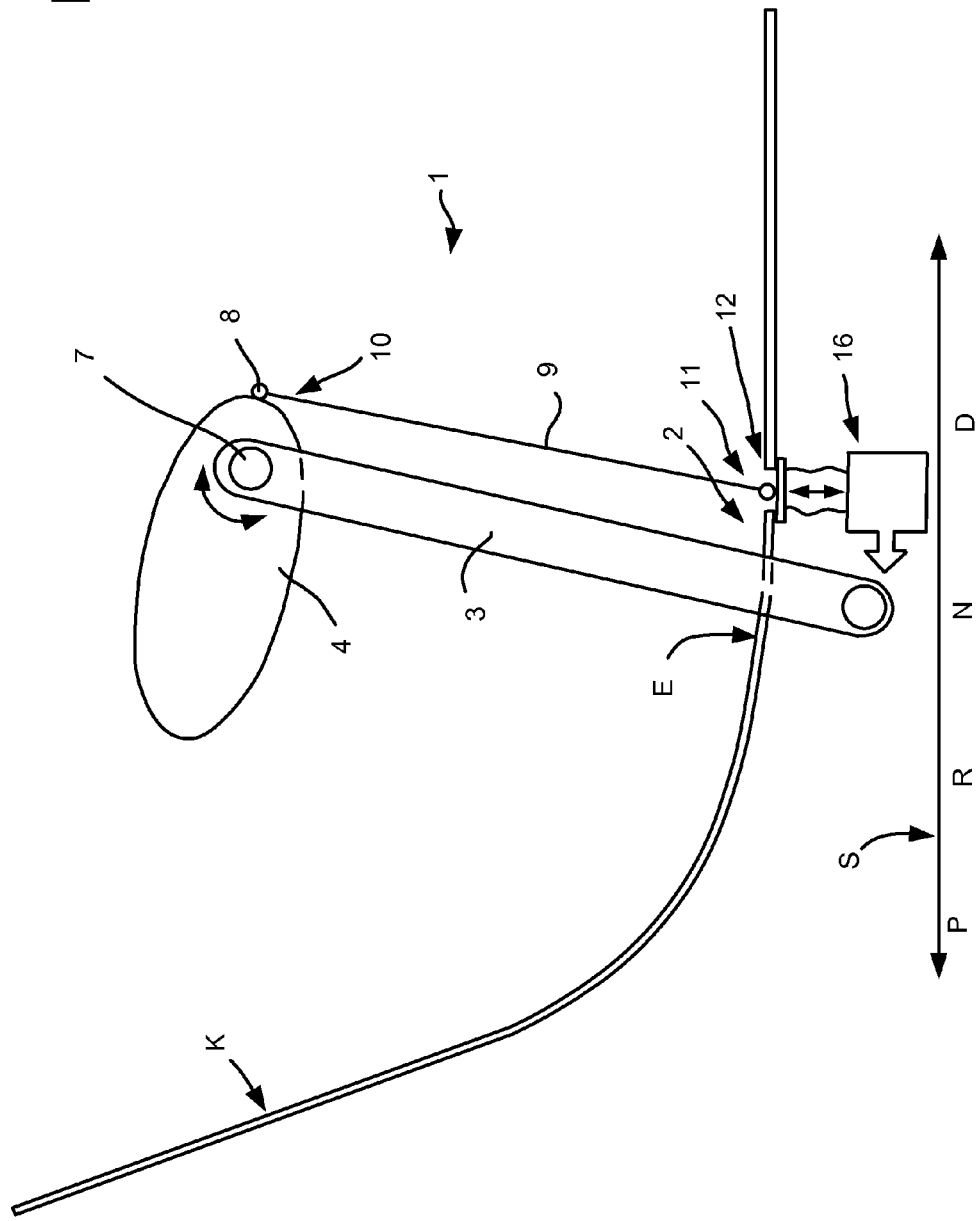
FIG. 4 shows a schematic sketch of the use of the hand rest for manual shifting according to a second embodiment of the selector lever arrangement.

Another embodiment shown in FIG. 4 does not have a separate rocker switch for the manual gear change. In this embodiment, the manual gear change is achieved by manually pivoting the hand rest 4 when the selector lever 3 is in the position D. The guide 9 is articulated on a switch 16 located at its fixing point 12, similar to the switching of the release mechanism of the previous embodiment, with the difference being that now in the D position manual pivoting of the hand rest 4 causes the guide 9 to push on the switch 16, which results in manual shifting of the automatic transmission.

While certain embodiments of the present invention have been described in detail, those familiar with the art to which this invention relates will recognize various alternative designs and embodiments for practicing the invention as defined by the following claims.

What is claimed is:
1. A selector lever arrangement for automatic transmissions of motor vehicles having manual shift capability comprising:
   a selector lever pivotable in a shifting gate forwards or backwards in only one plane into the positions P, R, N and D, all positions being situated in series in a shift direction in the one plane;

a hand rest pivotally mounted on the selector lever and pivotable about a first pivot axis, a rear portion of the hand rest extending rearward of the first pivot axis; and a guide having a first end pivotably mounted to the rear portion of the hand rest rearward of the first pivot axis, with the rearward direction being relative to the motor vehicle, and a second end pivotally mounted to a fixing point, the guide, hand rest and selector lever forming portions of a four-bar linkage wherein the hand rest is pivotally guided relative to the selector lever by way of the four-bar linkage such that an angle of the hand rest in relation to the selector lever varies according to the position of the selector lever.

2. The selector lever arrangement as claimed in claim 1, wherein the first pivot axis is oriented transversely to the shift direction of the selector lever.

3. The selector lever arrangement as claimed in claim 1, wherein the pivoting of the guide relative to the hand rest is about a second pivot axis that is oriented transversely to the shift direction of the selector lever.

4. The selector lever arrangement as claimed in claim 1, wherein the pivoting of the guide relative to the hand rest is about a second pivot axis, and wherein the first pivot axis and the second pivot axis are offset and parallel to each other.

5. The selector lever arrangement as claimed in claim 1, wherein the hand rest is elongated in the shift direction of the selector lever.

6. The selector lever arrangement as claimed in claim 1, including a release mechanism configured to release the selector lever to allow the selector lever to move back and forth in the shift direction, and wherein the release mechanism is configured to be actuated by a pivoting of the hand rest relative to the selector lever.

7. The selector lever arrangement as claimed in claim 6, wherein the guide is operatively connected at the second end to the release mechanism such that the release mechanism is actuated by the guide pushing on the release mechanism when the hand rest is pivoted relative to the selector lever.

8. The selector lever arrangement as claimed in claim 1, wherein the hand rest includes an actuating device configured to cause manual shifting of the automatic transmission when the actuating device is actuated.

9. The selector lever arrangement as claimed in claim 8, wherein the actuating device is a rocker switch mounted on the hand rest.

10. The selector lever arrangement as claimed in claim 1, including a manual shifting switch mounted adjacent to the fixing point, wherein the manual shifting switch is configured to be actuated by the second end of the guide to cause manual shifting of the automatic transmission when the selector lever is in the D-position and the hand rest is pivoted relative to the selector lever.

\* \* \* \* \*